May 6, 1952  J. J. PROHASKA  2,596,078
SKINNING KNIFE
Filed June 12, 1946
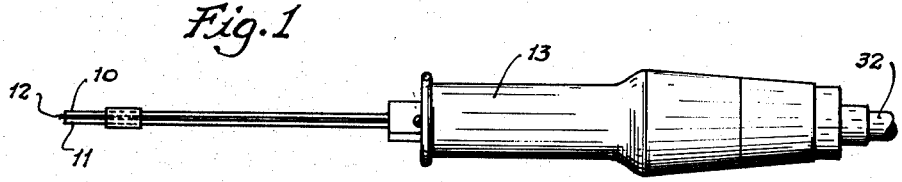
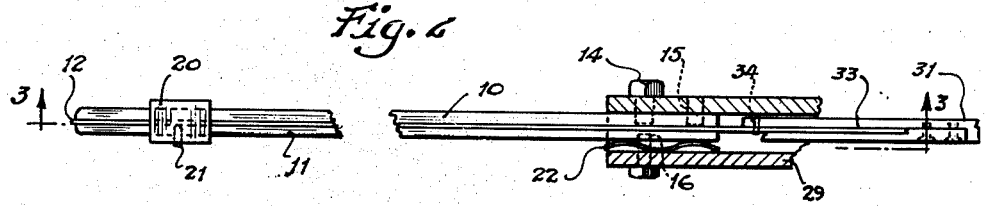
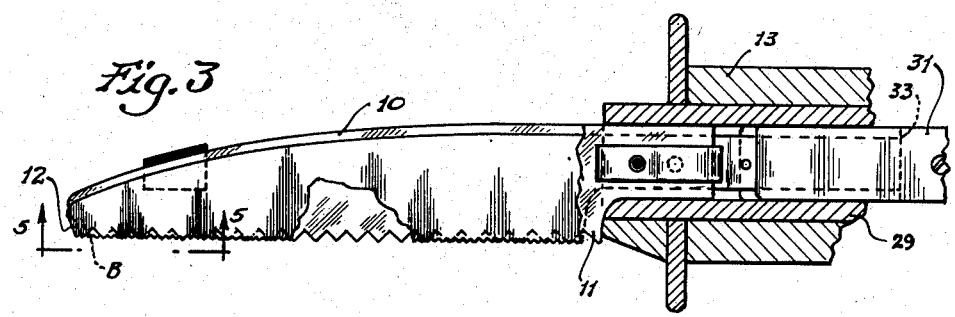
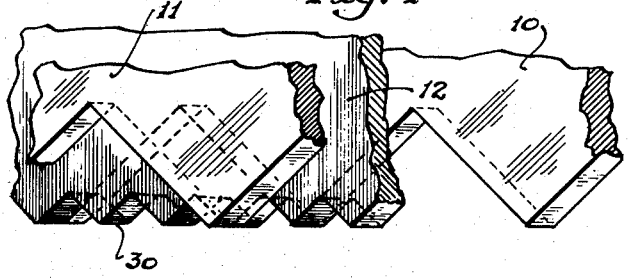
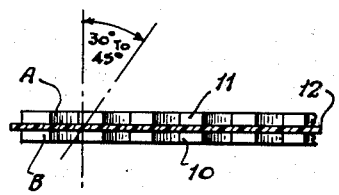
INVENTOR.
James J. Prohaska
BY
R. G. Story
ATTORNEY

Patented May 6, 1952

2,596,078

UNITED STATES PATENT OFFICE 2,596,078

SKINNING KNIFE

James J. Prohaska, Palos Heights, Ill., assignor to Swift & Company, Chicago, Ill., a corporation of Illinois Application June 12, 1946, Serial No. 676,225

11 Claims. (Cl. 30—215)

This invention relates to a skinning means and more particularly to a power driven skinning knife.

It is an object of this invention to provide an improved power driven skinning means.

It is a further object of this invention to provide a power driven skinning means having inherent safety features.

It is a further object of this invention to provide a skinning knife which automatically sharpens itself as it operates.

A further object of this invention is to provide an improved cutting arrangement for severing the fell layer between the skin and the carcass of cattle and the like.

Another object of this invention is to provide an improved construction whereby a new cutting blade can be rapidly assembled in the power driven cutting means to condition the device for use.

Other objects will appear from the specification below.

In the drawings:

Figure 1 is a top plan view showing the handle, with the cutting means forming the subject of this invention, extending outwardly therefrom;

Figure 2 is a top plan view partly broken away showing the cutting means, including the mounting means for the knife blade on the end of the power driven means;

Figure 3 is a view taken on line 3—3 of Figure 2;

Figure 4 is a perspective view showing the relation ship between the guard teeth and the cutter blade teeth; and Figure 5 is a view taken along lines 5—5 of Figure 3.

Various means have previously been proposed as a substitute for the manual skinning of animals and particularly cattle but until the present development, no completely successful means have been found useful for commercial cattle skinning operations. It is desirable to apply power to this cutting operation in order to speed it up and to reduce the work which must be performed by hand. Such power means must be designed from the standpoint of safety to the operator and lightness for handling, coupled with the ability to perform a heavy duty job. As above stated many attempts have been made to solve the problem; however, all devices proposed to date have been rejected and, heretofore, even in the big packing plants, the skinning of cattle has been practiced almost entirely as a manual art.

The present invention has been made to provide a power means for this necessary cattle skinning task and it embodies the features of durability and lightness together with an improved cutting principle which has proven to be highly satisfactory. The device of this invention takes the form of a pair of guard members between which a cutting blade reciprocates. The edges of the guard members and the cutting blade are each serrated and the individual teeth of the serrated edges cooperate so that as the blade moves between the guards, fibers falling between the teeth are sheared between a blade tooth and a guard tooth. The guard members are supported from the handle of the tool in such a manner as to snugly engage each side of the cutting blade whereby the blade is rubbed as it reciprocates and is thus continuously steeled during operation to dress the cutting edges.

Referring to the drawings, the preferred form of the device is shown therein and in Figure 1 the guard elements are indicated as 10 and 11, the cutting blade being denoted as 12. The guard member 10 as best shown in Figure 2 is fixedly mounted from the handle 13 by means of a bolt 14 and a centering pin 15. The guard member 11 is supported from the handle 13 and guard 10 in a "floating" manner and for this purpose is mounted upon a centering pin 16 at the handle and at its opposite end, from a spring clip 20 integral with guard member 10. The spring clip 20 is provided with a pin 21 upon which guard 11 may be centered. A leaf spring 22 is provided adjacent pin 16, and spring clip 20 and leaf spring 22 urge the floating guard 11 toward the relatively fixed guard 10. When replacing a cutting blade, the guard member 11 may be quickly removed from the knife by taking out the centering pin 16 and springing the guard member 11 from off of the centering pin 21.

The reciprocally driven cutting blade 12 is mounted to move between the guard members 10 and 11 and the blade 12 is removably carried at the outer end of a reciprocating drive element 31 slidably mounted in a bearing 29 fixed in the handle. The element 31 may be reciprocated by any suitable drive means and it has been found quite satisfactory to use a flexible cable 32 to transmit motion from a motor to the handle 13 which contains a suitable gear and crank mechanism to convert the rotary motion to a reciprocating motion. The outer end of the drive element 31 is bifurcated to provide a slot 33 to receive the inner end of the knife blade, one branch of the bifurcated end of the drive element being longer than the other. The longer branch carries a centering pin 34 which interfits with an aperture provided in the knife blade to fix it to the drive element, and the pin and the slot cooperate with the end of the knife to hold it projected outwardly in a fixed position with respect to the drive element 31.

The working edges of each of the guard elements 10 and 11 and of the knife blade 12 are serrated as above explained to provide a set of shearing edges for cutting fibres falling between the teeth; such for example as in skinning cattle, the fibres of the fell layer holding the skin to the carcass. The teeth at the edges of the guard members 10 and 11 are preferably arranged oppositely to each other while the teeth on the cutting blade are formed slantwise across the edge of the cutting blade for a purpose that will appear more fully below. Thus, the cutting blade teeth are preferably ground across the blade on an angle of between 30° to 45° as best seen in Figure 5. The teeth on the guard members are designed to have a pitch approximately three to four times that of the pitch of the teeth on the cutting blade and the cutting blade has a stroke about equal to the pitch of the teeth on the guard members.

The guard teeth are spaced wide enough apart to let fibres into the shearing edges, and for skinning cattle the guard teeth are spaced about ¼ inch apart. This spacing for cattle skinning permits the fell fibres to enter into the serration of the guards and the cutting blade edge while the skin and carcass surface can not ordinarily bend sharply enough to fall into the cutting means. The blade teeth are designed to be of a size to permit fibres to readily fall between them and in general the more teeth there are on the blade, the more extensive will be the shearing surface. For skinning cattle, blade teeth about $\frac{1}{16}$ inch apart have been found best; a smaller distance tends to prevent the fell fibres falling into the serrated edge; yet on the other hand, if the teeth are larger, the extent of the shearing surface is reduced. Thus for skinning cattle, teeth on the blade are preferably ground on a $\frac{1}{16}$ inch pitch with the guard teeth being spaced apart about $\frac{3}{16}$ inch to ¼ inch.

The cutting blade is designed to have a length such that when moved to the outer end of its stroke, approximately two teeth on the blade 12 will project beyond the last pair of teeth A and B (Figure 5) on the guard elements. Thus as the blade reciprocates, the two end teeth on the blades will alternately project beyond the last pair on the teeth on the guards and then be drawn inwardly between the guard members a distance approximately equal to two cutting blade teeth.

The blade is reciprocated quite rapidly and as the knife is pushed into the fell layer of the cattle carcass, the fibers of the fell fall into the space between the teeth on the cutting blade and are sheared upon being moved against the teeth on the guard members. As the knife drives in one direction or the other, fibres of the fell layer are sheared when the teeth on the cutting blade pass the teeth on the guard members. Due to the angular formation of the cutting blade teeth, it is seen that first one edge of a given tooth on the cutting blade will pass one edge of the oppositely disposed guard member teeth and thereafter the other edge of the given blade tooth will pass into cutting relation with respect to the other member of the pair of guard teeth.

The disposition of the cutting blade teeth on an angle as clearly shown in Figure 5 is important for the reason that whenever a particular fell fiber is caught between a blade tooth and a guard tooth, it is severed in only one point. This reduces the energy required to sever the fell layer to a minimum and eliminates the presence of fell fibre particles. It is obvious that if the teeth on the knife blade 12 were ground at an angle of 90° across the face of the cutting edge, a fiber trapped between the teeth on the cutting blade and a pair of teeth on the guard members would be simultaneously cut at two points as the cutting blade moved along. This would require twice the cutting force and a discrete fell fibre particle equal in length to the width of the blade would be produced. This possibility is avoided by disposing the guard teeth with respect to the cutting blade so that first one edge of the cutting blade tooth passes a guard tooth and then the other edge of that cutting blade tooth passes the second guard member tooth. The same effect may be accomplished by disposing the teeth on the guard members slightly off center with respect to each other rather than directly opposite to each other.

In using this knife during the cattle skinning operation, the nose of the knife, which is tapered to a rather thin point, is first inserted between the skin and the surface of the carcass to begin the separation of the fell layer. In general, the same system of separating the skin from the carcass is followed when using the power knife here described as is now practiced in manual skinning. While the carcass is held suspended from its hind legs, the knife is first inserted between the skin and the surface of the carcass at a point along a cut extending lengthwise of the belly of the carcass and a portion of the belly and each of the hind legs is cleared. Then the forelegs and neck section is operated upon. After the skin at the foreleg and neck area has been separated, the skin is freed from over the chest and shoulders of the carcass. The operator then goes back to the hind end and cuts the skin from the rump, leaving it still attached to the tail. The back area is then skinned with long sweeping cuts, always leaving the skin hanging from an area near the rump. After the back has been finally cleared, the skin is pulled free from the carcass by stripping it from the tail. To expedite the skinning operation, the skin along the inside of the hind and forelegs is opened manually as conventional in "cutting the pattern." Thereafter, however, the power knife is used to separate the skin from the legs and remainder of the carcass.

The pointed or tapered nose portion of the knife serves during the skin opening operation and also fits into close quarters so that the power knife may be used around the sharp curves found at the shoulders and at other points around the carcass. It is important that the cutting blade have a stroke sufficiently long to project several teeth beyond the last pair of guard teeth as above explained, so that the fell layer in front of the nose section of the knife will be cut. If this is not done, a heavier pushing force is required to drive the nose area of the knife, i. e. the pair of teeth A and B of guards 10 and 11, Figure 5, through the fell layer.

In clearing the broad sections of the back, rump, and over the neck, long sweeping strokes may be made. As the operator moves the knife, first in one direction and then the other, the knife must be turned to present the shearing edge against the fell layer. It is conceivable that a shearing edge could be provided on each edge of the knife; however, this construction with its attendant complications has not been found necessary because of the arrangement made for connecting the drive means 32 to the handle 13. If, as above stated, a flexible cable is preferably used to transmit rotary power from a motor to the motion converting means in the handle, the cable 32 may be connected to the handle through a suitable bearing joint such that the handle may rotate with respect to the fixed outer sheath of the cable. When such a connection is provided, the reaction of the handle 13 with respect to the inside drive member of the cable 32, will cause the handle to rotate if it is free. Thus if the operator momentarily relaxes his grip on the knife at either end of the long sweeping stroke, the knife will quickly spin so that the operator can grab it after it has turned through approximately 180° and the knife may then be moved in the opposite direction. In following this practice, the knife may be quickly reversed without effort on the part of the operator and only a single cutting edge need be provided.

The use of a thin blade snugly positioned between the two guards has a particular advantage in that the weight of the reciprocating parts is minimized. Such structure makes possible the use of a light weight rapidly moving drive mechanism.

Further, with the structure described above, the relatively thin cutting blade 12 is constrained to a movement between the two guard members 10 and 11. The guard members are preferably made of a harder material than the blade and, in any event, the blade is snugly positioned between the guard members such that a close rubbing contact results. This is occasioned by the resilient and "floating" mounting of the guard member 11 so that it is biased toward the fixed guard member 10. The tension on the spring clip 20 and leaf spring 22 is such that a sufficient pressure is maintained so as to hold the knife blade against buckling without unduly binding the blade during its reciprocation. This structure serves the dual purpose of permitting the use of a relatively heavy driving force on a thin knife blade to accomplish the required shearing action during both the pulling and pushing stroke of the cutting blade while at the same time providing the means for sharpening the knife as the blade reciprocates.

During use of the knife, the blade is dulled to some extent and when the guard members are held snugly against the side faces of the cutting blade, the blade is rubbed so that it is continuously steeled during use. If the cutting blade becomes quite dull, it is necessary merely to hold the knife free of the carcass and let the blade reciprocate for a few moments to again condition the cutting edge for use. By providing such an inherent steeling action, it is possible by a suitable selection of blade and guard materials to provide a knife blade that may be used for from 4 to 8 hours at a time without requiring honing or grinding.

The guard members 10 and 11 prevent the reciprocating blade from coming in contact with the skin or the surface of the carcass. This substantially eliminates the scoring of either the carcass or the skin. Furthermore, it is even possible to lay the serrated edge of the knife lightly against the hand of an operator without cutting the skin. This device has been found to be very safe in use and eliminates the scoring of the carcass or skin which tends to depreciate the value of the product.

The machine described herein may be used to skin all carcasses where the skin is fixed to the carcass through an intermediate fell layer; but it has been found to have an especial usefulness in the skinning of chilled calf carcasses. The skin on a chilled carcass closely adheres to the surface of the carcass and the knife can be inserted between the skin and surface of the carcass by an unskilled operator without likelihood of damaging either the hide or the carcass. On the other hand, because the skin on a freshly killed carcass is very loosely adherent thereto, relatively less skill is required in manual skinning of a hot carcass, but this power knife also is recommended for this use because of its safety features and because of the fact that unskilled labor may be used for this quite delicate operation.

As above explained, the embodiment shown herein is that of a preferred form of carrying out the invention here disclosed. It is conceivable that modifications may occur to those skilled in the art which will fall within the scope of the following claims.

I claim:

1. A device for skinning cattle and the like comprising a pair of hardened guard members each having a serrated edge, a thin and flexible driven cutting blade disposed between said members, said blade having a serrated edge, one of said guard members being relatively fixed and the other of said members being resiliently urged toward said fixed guard member whereby the blade is snugly engaged between said guard members so that the blade is steeled while it moves between said guards, the teeth on said members and on said blade being so cut and positioned that each tooth on the blade cuts first with a tooth on one of the guard members and then with a tooth on the other of the guard members.

2. A device for skinning cattle and the like comprising a pair of hardened guard members each having a serrated edge, a thin, flexible, and reciprocally driven cutting blade disposed between said members, said blade having a serrated edge, one of said guard members being relatively fixed and the other of said guard members being resiliently urged toward said fixed guard member whereby the blade is snugly engaged between said guard members, the teeth on said members and on said blade being so cut and positioned that each tooth on the blade cuts first with a tooth on one of the guard members and then with a tooth on the other of the guard members.

3. A device for skinning cattle and the like comprising a pair of guard members each having a serrated edge, a reciprocally driven cutting blade disposed between said members, said blade having a serrated edge, one of said guard members being relatively fixed and the other of said guard members being resiliently urged toward said fixed guard member whereby the blade is snugly engaged between said guard members, said guard members being made of a harder metal than the cutting blade, the teeth on said members and on said blade being so cut and positioned that each tooth on the blade cuts first with a tooth on one of the guard members and then with a tooth on the other of the guard members.

4. A device for skinning cattle and the like comprising a pair of guard members each having a serrated edge; a reciprocally driven cutting blade disposed between said members; said blade having a serrated edge; the serrations on said blade cooperating with the serrations on said members to shear fibers falling into the space between the teeth of the serrated edges; and the teeth of the serrations of the blade being ground with respect to the position of the teeth on the members, such that as the blade moves first one given blade tooth edge adjacent one member moves into and past a shearing relation with respect to a tooth on said one member and then the respective end of that blade tooth adjacent the other of the members moves into and past a shearing relation with respect to a tooth on the said other of the guard members.

5. A device for skinning cattle and the like comprising a pair of guard members each having a serrated edge; a reciprocally driven cutting blade disposed between said members; said members being resiliently urged together so that the blade has a close rubbing contact with each member; said blade having a serrated edge; the serrations on said blade cooperating with the serrations on said members to shear fibers falling into the space between the teeth of the serrated edges; and the teeth of the serrations of the blade being ground with respect to the position of the teeth on the members, such that as the blade moves first one given blade tooth edge adjacent one member moves into and past a shearing relation with respect to a tooth on said one member and then the respective edge of that blade tooth adjacent the other of the members moves into and past a shearing relation with respect to a tooth on the said other of the guard members.

6. A device for skinning cattle and the like by severing the fell layer between the skin and the carcass comprising a handle, a pair of guard members each having a serrated edge, and a reciprocally driven cutting blade disposed between said members, said blade having a serrated edge, the pitch of the teeth on the members being about four times the pitch of the teeth on the blade.

7. A device for skinning cattle and the like comprising a pair of guard members each having a serrated edge, the teeth on one guard member being disposed oppositely to the teeth on the other guard member, and a reciprocally driven cutting blade disposed between said members, said blade having side walls and a serrated edge, the teeth of said blade being formed at an angle laterally across the serrated edge of the blade, said angle being less than 90° with respect to the side walls of the blade.

8. A device for skinning cattle and the like comprising a pair of guard members each having a serrated edge, the teeth of one guard member being disposed oppositely to the teeth on the other guard member, a reciprocally driven cutting blade disposed between said members, said members being resiliently urged into close abutting relationship against opposite sides of said blade, and said blade having side walls and a serrated edge, the teeth of said blade being formed at an angle laterally across the serrated edge of the blade, said angle being less than 90° with respect to the side walls of the blade.

9. A device for skinning cattle and the like comprising a pair of guard members each having a serrated edge, the teeth on one guard member being disposed oppositely to the teeth on the other guard member, and a reciprocally driven cutting blade disposed between said members, said blade having side walls and a serrated edge, one of said guard members being relatively fixed and the other of said members being resiliently urged toward said fixed member so that the members have a close abutting relationship with the opposite sides of said blade, the teeth of said blade being formed at an angle laterally across the serrated edge of the blade, said angle being less than 90° with respect to the side walls of the blade.

10. A device for skinning cattle and the like comprising a pair of longitudinally extending guard members which taper to a nose at one end, said members each having a serrated edge, and a reciprocally driven cutting blade disposed between said members, said blade having a serrated edge, the pitch on the teeth of said guard members being about three to four times that of the teeth on said blade, the teeth on said members being disposed oppositely to each other, and the stroke of said blade being of a length to drive the last several teeth on the blade outwardly past the last pair of teeth on said guard members.

11. A means for skinning cattle and the like by severing the fell layer between the skin and the carcass, comprising a handle, a pair of guard members, each member having a serrated edge, the teeth on said serrated edge having a pitch of about $\frac{3}{16}$ to $\frac{1}{4}$ inch, and a reciprocally driven cutting blade disposed between said members, the said blade having a serrated edge, the teeth on said cutting blade having a pitch of about $\frac{1}{16}$ of an inch.

JAMES J. PROHASKA.

REFERENCES CITED

The following references are of record in the file of this patent:

UNITED STATES PATENTS

| Number | Name | Date |
| --- | --- | --- |
| 432,433 | Palmer | July 15, 1880 |
| 650,924 | Boynton | June 5, 1900 |
| 1,481,168 | Wilson | Jan. 15, 1924 |
| 1,543,316 | Bristow | June 23, 1925 |
| 1,647,867 | Hutsell | Nov. 1, 1927 |
| 2,081,318 | Wright | May 25, 1937 |
| 2,083,359 | Branch | June 8, 1937 |
| 2,168,703 | Dziedzic | Aug. 8, 1939 |
| 2,180,244 | Kosterman | Nov. 14, 1939 |
| 2,268,221 | Mischker | Apr. 14, 1941 |
| 2,275,180 | Holsclaw | Mar. 3, 1942 |
| 2,305,465 | Bangser | Dec. 15, 1942 |

FOREIGN PATENTS

| Number | Country | Date |
| --- | --- | --- |
| 361,014 | Italy | July 11, 1938 |
| 507,101 | France | June 14, 1920 |